(12) United States Patent
Boerup et al.

(10) Patent No.: US 10,712,639 B2
(45) Date of Patent: Jul. 14, 2020

(54) CAMERA SHOE RECEIVING DEVICE

(71) Applicant: MGMD BrainPower LLC, Tucson, AZ (US)

(72) Inventors: Spencer Boerup, Tucson, AZ (US); Christopher Witham, Midvale, UT (US)

(73) Assignee: MGMD BRAINPOWER LLC, Tucson, AZ (US)

( * ) Notice: Subject to any disclaimer, the term of this patent is extended or adjusted under 35 U.S.C. 154(b) by 0 days.

(21) Appl. No.: 16/437,386

(22) Filed: Jun. 11, 2019

(65) Prior Publication Data

US 2019/0377246 A1    Dec. 12, 2019

Related U.S. Application Data

(60) Provisional application No. 62/683,506, filed on Jun. 11, 2018.

(51) Int. Cl.
*G03B 17/56* (2006.01)
*F16M 13/02* (2006.01)
*G03B 15/02* (2006.01)

(52) U.S. Cl.
CPC ......... *G03B 17/566* (2013.01); *F16M 13/022* (2013.01); *G03B 15/02* (2013.01); *G03B 2215/0514* (2013.01)

(58) Field of Classification Search
None
See application file for complete search history.

(56) References Cited

U.S. PATENT DOCUMENTS

| 3,914,779 A | 10/1975 | Terunuma | |
|---|---|---|---|
| 4,291,967 A * | 9/1981 | Jackson, Jr. | G03B 15/03 362/8 |
| 4,329,735 A * | 5/1982 | Kawazoe | G03B 15/03 362/109 |
| 5,630,183 A * | 5/1997 | Hagiuda | G03B 17/566 396/198 |
| 8,335,427 B1 * | 12/2012 | Schmidt | G03B 13/02 396/534 |
| 2005/0041966 A1 * | 2/2005 | Johnson | F16M 11/041 396/428 |

(Continued)

OTHER PUBLICATIONS

PCT International Search Report and Written Opinion in International Application PCT/US2019/036527, dated Jun. 11, 2019, 10 pages.

*Primary Examiner* — William B Perkey

(57) ABSTRACT

A clamp assembly for securing a shoe plate of a camera accessory includes a bracket, a lever ring disposed around the bracket between the first end and the second end, and a base plate. The base plate is configured to move when the lever ring is rotated so as to secure the shoe plate between the base plate and the bracket. The clamp assembly is coupleable to a device that includes a housing and a mount configured to attach to a boom. The housing is rotatable relative to the mount about a rotation axis. The device also includes an actuator assembly and a latch coupled thereto. The actuator assembly is configured to move the latch between an engaged position with the mount, which prevents rotation of the housing relative to the mount, and a disengaged position with the mount, which enables rotation of the housing relative to the mount.

20 Claims, 12 Drawing Sheets

(56) References Cited

U.S. PATENT DOCUMENTS

| | | | |
|---|---|---|---|
| 2006/0177215 A1* | 8/2006 | Johnson | F16M 11/02 |
| | | | 396/419 |
| 2011/0205426 A1 | 8/2011 | Kang | |
| 2012/0106946 A1 | 3/2012 | Johnson | |
| 2012/0189292 A1* | 7/2012 | Kim | G03B 15/03 |
| | | | 396/198 |
| 2013/0223831 A1 | 8/2013 | Miyakawa et al. | |
| 2013/0233988 A1* | 9/2013 | Johnson | G03B 17/561 |
| | | | 248/229.14 |
| 2014/0212120 A1* | 7/2014 | Bae | G03B 15/05 |
| | | | 396/198 |
| 2015/0215483 A1* | 7/2015 | Farnsworth | H04N 1/00557 |
| | | | 348/207.1 |
| 2018/0019552 A1* | 1/2018 | Kasugai | G03B 15/05 |
| 2018/0210324 A1* | 7/2018 | Harden | G03B 17/566 |
| 2019/0377246 A1* | 12/2019 | Boerup | G03B 17/566 |

* cited by examiner

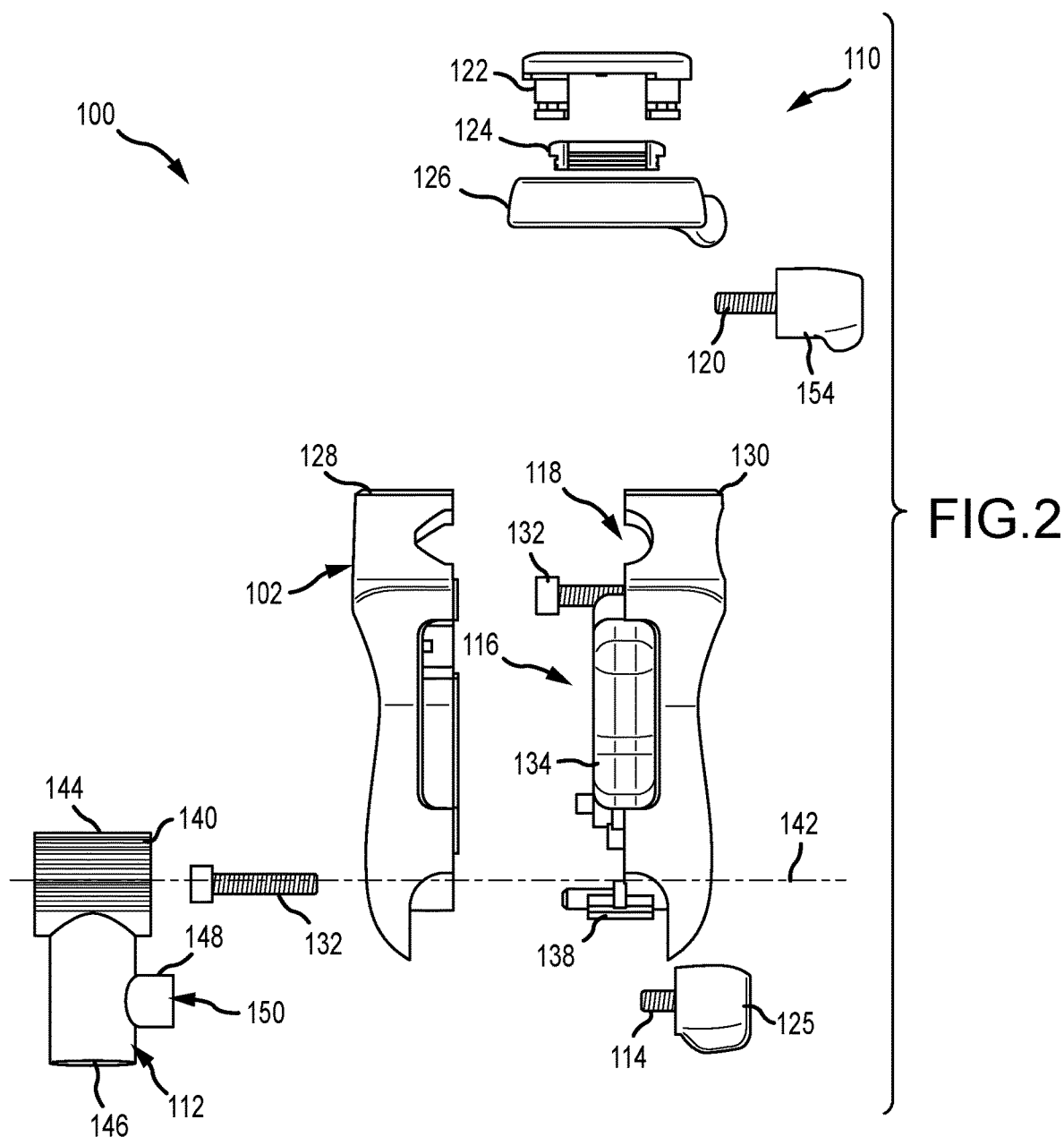

CAMERA SHOE RECEIVING DEVICE

CROSS-REFERENCE TO RELATED APPLICATIONS

This application claims priority to and the benefit of U.S. Provisional Application No. 62/683,506, filed Jun. 11, 2018, titled "CAMERA SHOE RECEIVING DEVICE," the disclosure of which is hereby incorporated by reference herein in its entirety.

INTRODUCTION

To aid in the use of cameras, accessory devices may be used. Camera accessory devices may include flash units, light meters, viewfinders, rangefinders, etc. Some known accessory devices are attach to the cameras with an accessory shoe plate. The accessory shoe plate typically extends from the accessory device and is received within a corresponding bracket disposed on the camera. The typical shoe plate can be secured to the bracket by one or more thumb-screws such that the camera accessory is attached to the camera.

The accessory shoe plate may be a "hot" shoe plate that electrically couples the shoe plate to a contact plate so that the camera and the accessory devices are electrically coupled to one another. The accessory shoe plate may conversely be a "cold" shoe plate which merely mechanically couples the camera and the accessory devices without an electrical connection.

Additionally, accessory devices may be attached to a separate mount assembly that includes one or more brackets which receive the accessory shoe plate. These known mount assemblies may be used to arrange one or more accessory devices for use with the camera.

Securing the accessory shoe plate to the bracket presents challenges, however. For example, certain accessory devices are large and bulky while the shoe plate and bracket are relatively small. As such, the accessory devices are difficult to position on the bracket for securement, and the thumb-screws are difficult to actuate. These issues may be further amplified if using the equipment outdoors and/or in inclement weather. Additionally, the bracket and thumb-screws can be easily lost and misplaced.

It is with respect to these and other considerations that the technologies described below have been developed. Also, although relatively specific problems have been discussed, it should be understood that the embodiments should not be limited to solving the specific problems identified in the introduction.

Camera Shoe Receiving Device

Aspects of the technology relate to a mounting device for camera accessories. The mounting device is configured to receive and secure a shoe plate of the camera accessory via a clamp assembly. In aspects of the technology, the clamp assembly compresses the shoe plate between a bracket and a base plate through the rotation of a lever ring that surrounds both the bracket and the base plate. With this configuration securing the shoe plate may easily occur even in outdoor and/or inclement weather conditions. The lever ring may be threadably coupled to the base plate so that the number of moving components is reduced and a robust securing system is provided. In further aspects of the technology, the clamp assembly is attached to the mounting device so that the possibility of losing and misplacing components is reduced. The mounting device includes an actuation system that enables, for certain uses, easy positioning of the attached camera accessory as required or desired. In further aspects of the technology, actuating a trigger disengages a latch such that the mounting device may rotate before reengaging the latch to position the mounting device as needed.

In one aspect, the technology relates to a clamp assembly for securing a shoe plate of a camera accessory, the clamp assembly including: a bracket including a first end and an opposite second end and defining a longitudinal axis; a lever ring disposed around the bracket between the first end and the second end, wherein the lever ring is configured to rotate around the longitudinal axis between an open position and a closed position, the lever ring including an annular inner surface having one or more threads; and a base plate including at least one side surface having one or more threads that correspond to the one or more threads of the lever ring, wherein the base plate is disposed at least partially within the bracket between the first end and the second end and at least partially within the annular inner surface, the base plate configured to move along the longitudinal axis between a first position and a second position when the lever ring is rotated about the longitudinal axis, and wherein when the lever ring is in the closed position, the base plate is in the second position so as to secure the shoe plate between the base plate and the first end of the bracket.

In an example, the bracket includes two sidewalls that define an inner channel configured to receive at least a portion of the shoe plate, and wherein each sidewall includes an oblique surface disposed at an inlet of the inner channel. In additional/alternative examples, the first end of the bracket includes at least one cross-member that extends across the inner channel. In additional/alternative examples, the base plate is configured to be received within the inner channel. In additional/alternative examples, the lever ring includes a first end and an opposite second end, the first end including at least one circumferential notch defined therein, and wherein when the lever ring is in the open position, the at least one circumferential notch aligns with the inlet of the inner channel. In an example, the bracket includes an outer shoulder and the lever ring includes an annular shoulder seat that the outer shoulder rides on when the lever ring rotates, and wherein the annular shoulder seat includes a detent and the outer shoulder includes a recess configured to receive the detent, the recess defining a rotation angle of the lever ring. In an example, the bracket is configured to remain stationary upon rotation of the lever ring and movement of the base plate. In additional/alternative examples, the base plate includes a lock hole configure to receive at least a portion of a stopper pin extending from the shoe plate. In additional/alternative examples, the base plate includes one or more electrical contacts. In an example, the lever ring rotates relative to the bracket and the base plate.

In additional/alternative aspects, the technology relates to a device for a camera accessory, the device including: a housing including a first end and an opposite second end and defining a longitudinal axis; a mount rotatably mounted at least partially within the housing and extending from the second end, wherein the mount is configured to attach to a boom, and wherein the housing is rotatable relative to the mount about a rotation axis that is orthogonal to the longitudinal axis; an actuator assembly disposed at least partially within the housing; and a latch disposed within the housing and coupled to the actuator assembly, wherein the actuator assembly is configured to move the latch between a first position and a second position, and wherein in the first position, the latch is engaged with the mount preventing rotation of the housing relative to the mount, and in the second position, the latch is disengaged with the mount enabling rotation of the housing relative to the mount.

In an example, the actuator assembly includes a biasing element, and wherein the latch is biased into the first position by the biasing element. In additional/alternative examples, the actuator assembly includes a trigger including a first end and a second end, and wherein the first end is biased by the biasing element and the second end is pivotably disposed within the housing and coupled to the latch. In additional/alternative examples, the mount includes a plurality of circumferentially spaced teeth configured to engage with the latch. In still another example, the latch includes a single tooth configured to engage with the mount. In an example, the latch pivots between the first position and the second position. In additional/alternative examples, a clamp assembly is coupled to the first end of the housing, wherein the clamp assembly is configured to secure a shoe plate of a camera accessory. In additional/alternative examples, the clamp assembly includes: a bracket configured to couple to the first end of the housing; a lever ring disposed around the bracket, wherein the lever ring is configured to rotate about the longitudinal axis between an open position and a closed position, the lever ring including an annular inner surface having one or more threads; and a base plate including at least one side surface having one or more threads that correspond to the one or more threads of the lever ring, wherein the base plate is disposed at least partially within the bracket and at least partially within the annular inner surface, the base plate configured to move along the longitudinal axis between a first position and a second position when the lever ring is rotated about the longitudinal axis, and wherein when the lever rings is in the closed position, the base plate is in the second position positioned so as to secure the shoe plate between the base plate and the first end of the bracket. In an additional/alternative example, the second end of the bracket includes a dovetail configured to couple to the first end of the housing.

In other/additional aspects, the technology relates to a method of mounting a camera accessory to a device, the method including: sliding a shoe plate of the camera accessory into a clamp assembly, wherein the shoe plate is positioned between a bracket and a base plate; rotating a lever ring of the clamp assembly, wherein the lever ring is threadably engaged with the base plate; substantially simultaneously with rotating the lever ring, linearly moving the base plate towards the bracket so as to secure the shoe plate between the base plate and the bracket; actuating an actuator assembly disposed at least partially within the device to disengage a latch with a mount of the device; and rotating the device relative to the mount.

These and various other features as well as advantages that characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claim hereof as well as the appended drawings.

It is to be understood that both the foregoing introduction and the following detained description are exemplary and explanatory and are intended to provide further explanation of the invention as claimed.

BRIEF DESCRIPTION OF THE DRAWINGS

Non-limiting and non-exhaustive embodiments are described with reference to the following figures:

FIG. 2 is an exploded side view of the mounting device.

DETAILED DESCRIPTION

Before the mounting devices and method that are the subject of this disclosure are described, it is to be understood that this disclosure is not limited to the particular structures, process step, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise. As used in this disclosure, a camera is an optical instrument that records images. The images may be stored locally, transmitted to another location, or both. These images may be still photographs or moving images such as videos or movies. The medium upon which the images are stored may be video tape, digital media (RAM, ROM, CD, solid state drives, etc.), film, or any other now known or later developed medium suitable for storing images.

Figure 1A:
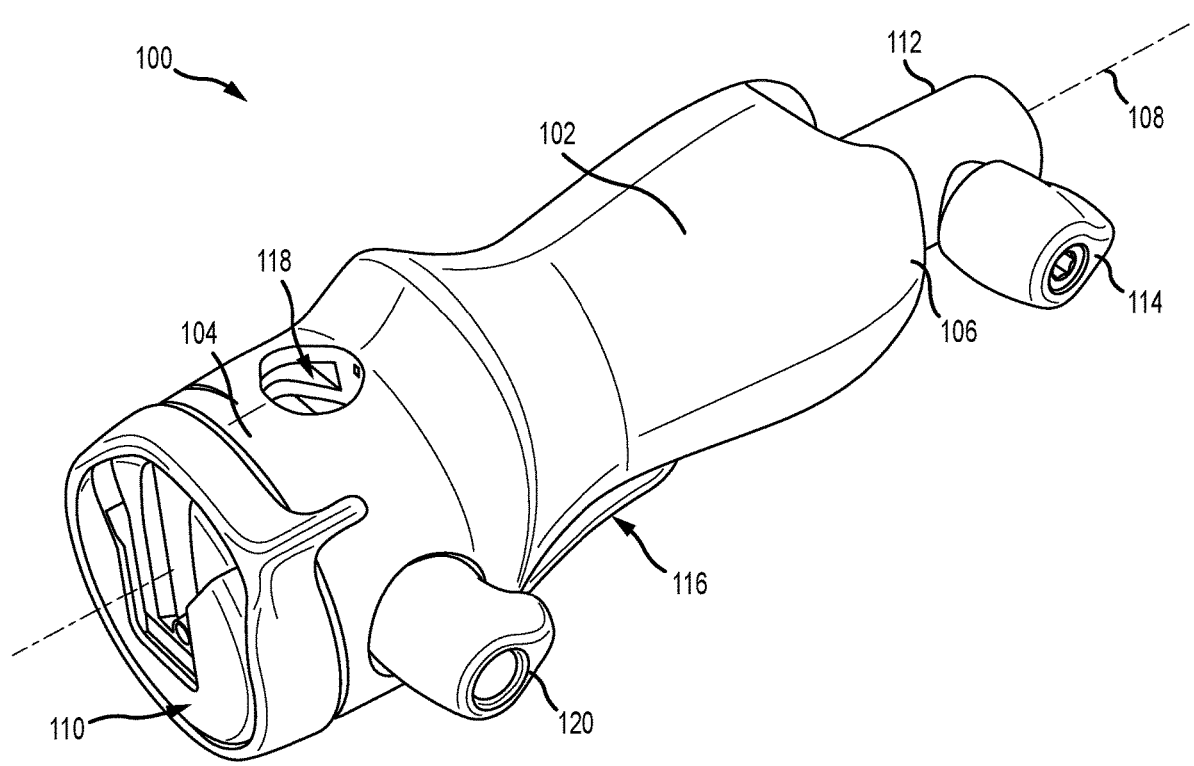
FIG. 1A is a perspective view of a mounting device for a camera accessory.
Figure 1B:
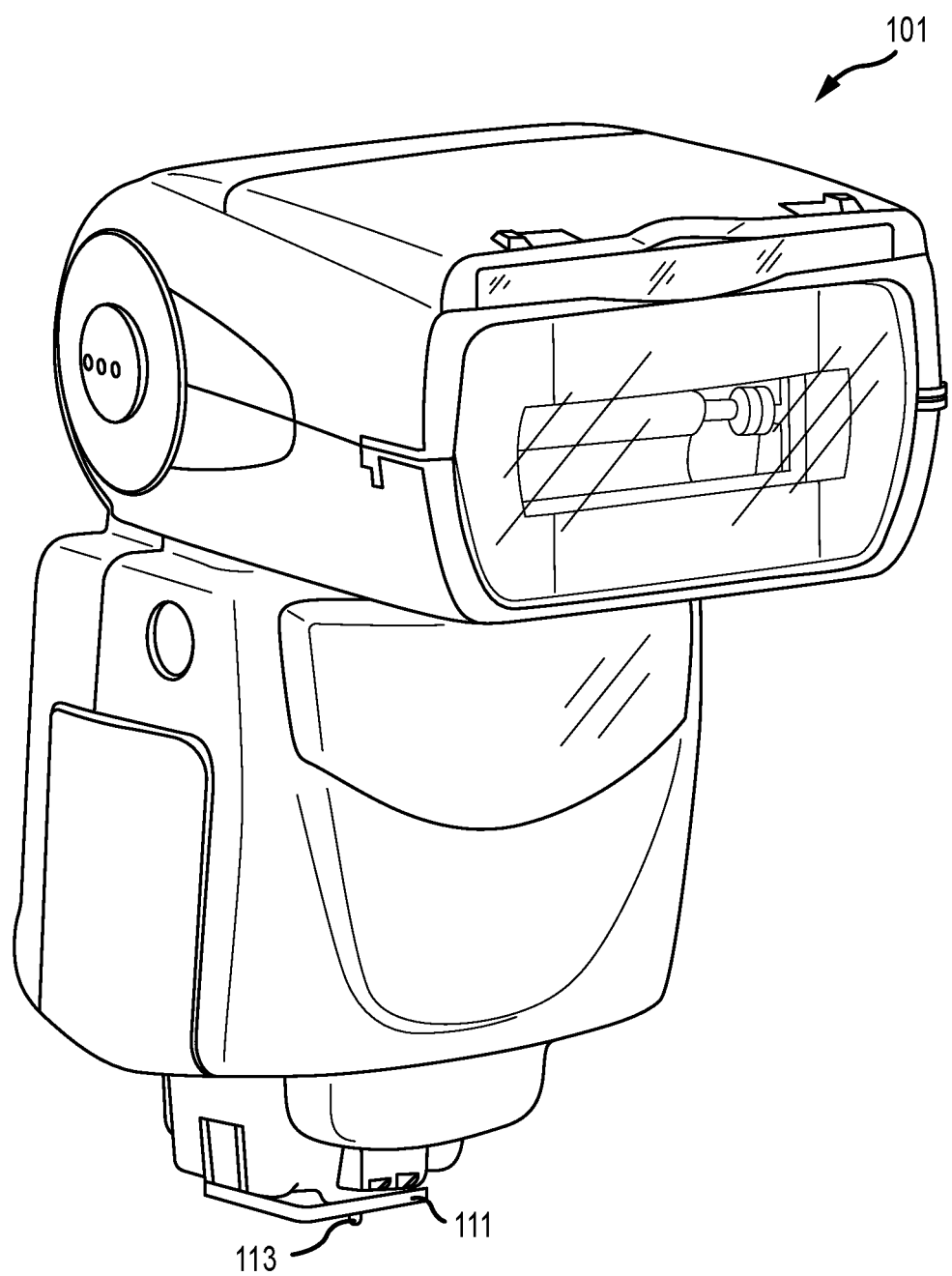
FIG. 1B is a perspective view of an exemplary camera accessory.

FIG. 1A is a perspective view of a mounting device 100 for a camera accessory. FIG. 1B is a perspective view of an exemplary camera accessory 101. Referring concurrently to FIGS. 1A and 1B, the mounting device 100 includes a housing 102 having a first end 104 and an opposite second end 106, which defines a longitudinal axis 108. As illustrated, a clamp assembly 110 is coupled to the first end 104 and is configured to receive and secure a shoe plate 111 of the camera accessory 101 so that it is supported by the mounting device 100. The clamp assembly 110 is described further below in reference to FIGS. 6-11.

In the example, the camera accessory 101 is a flash/lighting unit with the shoe plate 111 and a stopper pin 113 that may couple to the mounting device 100. It is to be understood that the camera accessory 101 is merely an example and other camera accessories, such as light meters, viewfinders, rangefinders, softboxes, etc., as required or desired may also be used in conjunction with a shoe plate, such as shoe plate 111, to attach to the mounting device. The shoe plate can be either a "cold" shoe plate with no electrical contacts or a "hot" shoe plate with electrical contacts as described above. As illustrated in FIG. 1B, the shoe plate 111 is a cold shoe plate.

In aspects of the technology, a mount 112 is rotatably mounted at least partially within the housing 102 and extends from the second end 106. The mount 112 is configured to receive a boom (not shown) so that the mounting device 100 may be attached to an end of the boom and utilized to position the camera assembly 101. The mount 112 includes a thumb-turn screw 114 that when turned, engages with the boom so as to releasably secure the mount 112 thereto. An actuator assembly 116 is disposed at least partially within the housing 102 and is coupled to the mount 112. In the example, the actuator assembly 116 is configured to enable rotation of the housing 102 relative to the mount 112 so as to enable positioning of the camera accessory 101 as required or desired. The actuator assembly 116 is described further below in reference to FIGS. 3-5.

In aspects of the technology, a passage 118 is defined through the first end 104 of the housing 102 and proximate the clamp assembly 110. The passage 118 extends through the housing 102 and is sized and shaped to receive a secondary boom (not shown) so as to attach additional camera accessories to the mounting device 100. The boom may be secured to the housing 102 by a thumb-turn screw 120 that when turned, engages with the boom so as to releasably secure the mounting device 100 thereto. In the example, the passage 118 is oriented substantially orthogonal to the longitudinal axis 108, although other orientations are also contemplated herein.

In operation, the camera accessory 101 (e.g., a flash unit) has the shoe plate 111. The shoe plate 111 is slid into the clamp assembly 110 at the first end 104 and a portion of the clamp assembly 110 is rotated about the longitudinal axis 108 to secure the camera accessory 101 to the mounting device 100. The mounting device 100 can be attached to a boom at the second end 106 by inserting a free end of the boom into the mount 112 and twisting the thumb-turn screw 114 to secure the mount 112 to the boom. The housing 102 may rotate in relation to the mount 112 and the boom by engaging the actuator assembly 116 such that the attached camera accessory 101 can quickly and easily be positioned as required or desired. In some examples, a second boom may be inserted and secured within the passage 118 via the thumb-turn screw 120, such that one or more additional camera accessories may be attached to the mounting device 100. With this configuration securing the shoe plate may easily occur even in outdoor and/or inclement weather conditions. Additionally, securing the shoe plate of a camera accessory 101 may, in embodiments of the technology, be performed with one hand. Additionally, the clamp assembly 110 is attached to the mounting device 100 so that the possibility of losing and misplacing components is reduced.

FIG. 2 is an exploded view of an example mounting device 100. In the example, the clamp assembly 110 includes a bracket 122, a base plate 124, and a lever ring 126 which are described further below in reference to FIGS. 6-11. In aspects of the technology, the housing 102 is formed from two halves 128, 130 such that components can be accessible therein. In the example, the first housing half 128 has an opening to receive one or more fasteners 132, such as a threaded Allen bolt, to couple the first housing half 128 to the second housing half 130 which has a corresponding threaded nut (not shown). In other examples, each housing half may be coupled together by any other fastening connection, such as a snap-fit or a press-fit, to enable the mounting device 100 to function as described herein. The housing 102 may also be ergonomically formed so as to enable quick and easy operation by one's left or right hand.

As illustrated, the actuator assembly 116 includes a trigger 134 that at least partially extends from the housing 102, a biasing element 136 (shown in FIGS. 3 and 4) that biases the trigger 134 and a latch 138 coupled to the trigger 134, which are described further below in reference to FIGS. 3-5. The mount 112 includes a substantially hollow cylindrical head 140 that is positioned around the lower fastener 132 such that the housing 102 can rotate relative to the mount 112 about a rotation axis 142. In the example, the rotation axis 142 is substantially orthogonal to the longitudinal axis 108 (shown in FIG. 1). The head 140 includes a plurality of circumferentially spaced teeth 144 that are configured to engage with the latch 138 when in operation.

As illustrated, opposite the head 140, the mount 112 includes a tube 146 that can receive the boom as described above. Proximate the tube 146 is a thumb-turn shoulder 148 which has a threaded opening 150 therethrough so that the thumb-turn screw 114 can engage with the tube 146. The opening 150 enables the thumb-turn screw 114 to extend all the way into the tube 146 and frictionally engage with the boom placed therein to secure the boom in place. The thumb-turn screw 114 may include an enlarged head 152 for ease of use. The other thumb-turn screw 120 that extends into the passage 118 also may include an enlarged head 154 for ease of use.

Figure 3:
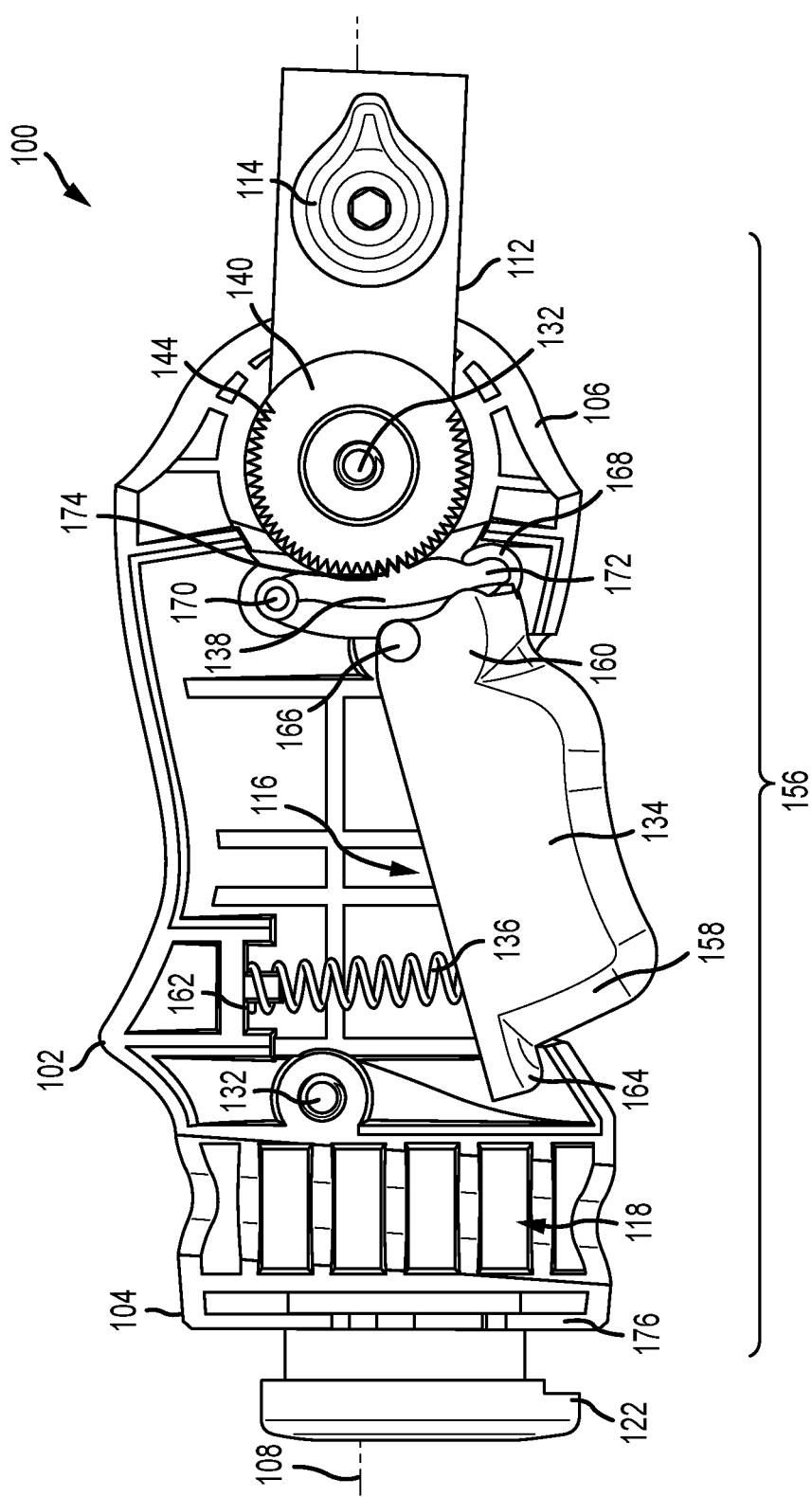
FIG. 3 is a partial interior view of the mounting device in an engaged position.

FIG. 3 is a partial interior view of the mounting device 100 in an engaged position 156. The trigger 134 includes a first end 158 and an opposite second end 160. The first end 158 is biased into the engaged position 156 by the biasing element 136 which is supported within the housing 102 by a seat 162. The biasing element 136 may be a spring or any other component that enables the actuator assembly 116 to function as described herein. The first end 158 of the trigger 134 also include a stop 164 that is configured to contact the housing 102 and prevent the first end 158 of the trigger 134 from pivoting out and away from the housing 102.

The second end 160 of the trigger 134 is pivotably disposed within the housing 102 about a pivot 166. Opposite the pivot 166, the trigger 134 includes a hook 168 that is configured to couple to the latch 138 that is pivotably disposed within the housing 102. The latch 138 includes a first end 170 which is formed as a pivot and an opposite second end 172 that is coupled to and received by the hook 168 of the trigger 134. The latch 138 includes one or more teeth 174 that are configured to engage with the mount teeth 144. In the example, multiple latch teeth 174 are used for a more robust system if the teeth become worn. However, in other examples, the latch 138 may include only a single tooth 174 (as shown in FIG. 4) because a single tooth is easier to engage with the mount teeth 144 for positing of the mounting device 100.

Additionally in the example, the bracket 122 includes a dovetail end configured to couple the bracket 122 to the first end 104 of the housing 102. For example, the first end 104 may include a face surface 176 that is shaped to receive a cutout defined in the bracket 122 so as to secure the bracket thereto. In alternative examples, the bracket 122 may be coupled to the housing 102 with any other connection configuration that enables the mounting device 100 to function as described herein.

In the engaged position 156, the biasing element 136 biases the trigger 134 and the latch 138 in the illustrated configuration. The trigger 134 is biased with the stop 164 proximate the housing wall so that the hook 168 is positioned towards the mount head 140 and that the latch 138 is engaged with the mount head 140 via the corresponding teeth 144, 174. This engaged position 156 restricts the housing 102 from rotating relative to the mount 112 and around the rotation axis 142 (shown in FIG. 2) so that the mounting device 100 stays oriented in the required or desired position. In operation, the actuator assembly 116 is configured to move the latch 138 from the engaged position 156 to a disengaged position 178 (shown in FIG. 4) so as to enable rotation of the housing 102 relative to the mount 112.

Figure 4:
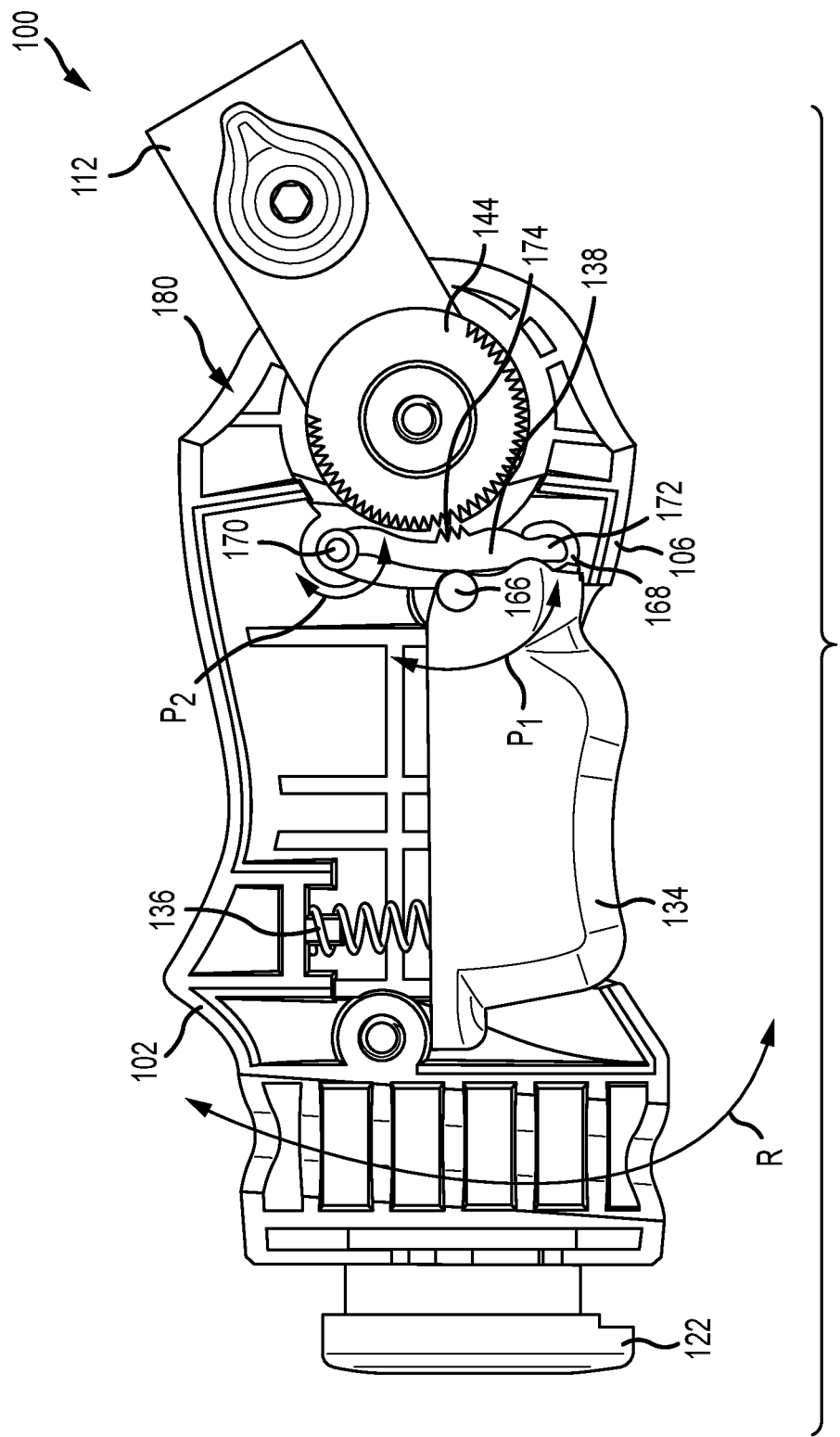
FIG. 4 is a partial interior view of the mounting device in a disengaged position.

FIG. 4 is a partial interior view of the mounting device 100 in the disengaged position 178. In the disengaged position 178, the latch 138 is disengaged from the mount 112 so as to enable the housing 102 to rotate R relative to the mount 112. To disengage the latch 138, the trigger 134 is depressed into the housing 102 overcoming the biasing element 136. As the trigger 134 is depressed into the housing 102, the trigger 134 pivots $P_1$ around the trigger pivot 166. This pivoting of the trigger 134 moves the hook 168 away from the mount 112 which also draws the second end 172 of the latch 138 away from the mount 112 because it is coupled to the hook 168. The movement of the second end 172 induces the latch 138 to pivot $P_2$ around its first end 170 and disengage the tooth 174 from the mount teeth 144 so that the housing 102 is freely rotatable R relative to the mount 112. In other examples, the actuator assembly 116 may be configured as a ratchet system which enables free movement in one rotation direction while the lever will need to be disengages for rotation in the opposite direction.

In the example, the housing 102 has a channel 180 defined in the second end 106, which the mount 112 extends from. The channel 180 provides a stop surface that defines the amount of rotation the housing 102 may rotate in relation to the mount 112. In an example, the housing 102 may rotate approximately 180°. In other examples, the housing 102 may have a larger rotation angle and rotate up to 270°, while in further examples, the housing 102 may have a smaller rotation angle and rotate up to 90°.

Figure 5:
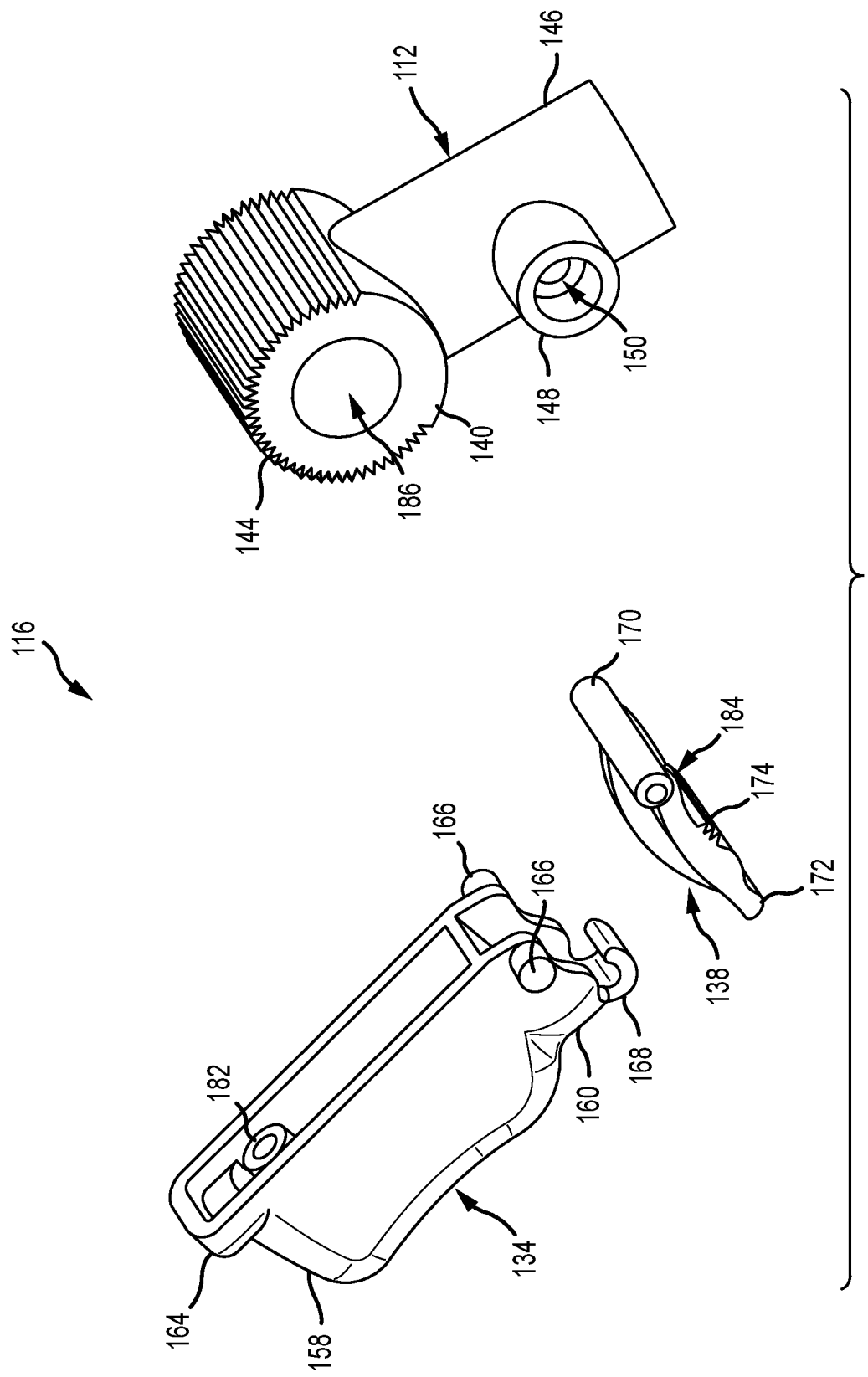
FIG. 5 is an exploded perspective view of an actuator assembly of the mounting device.

FIG. 5 is an exploded perspective view of the actuator assembly 116 of the mounting device 100 (shown in FIGS. 1-4). As illustrated, the trigger 134 includes the stop 164 extending from the first end 158. A trigger seat 182 is formed on the inside of the trigger 134 that supports the biasing element 136 (shown in FIGS. 3 and 4). The second end 160 of the trigger 134 includes two pivots 166 that are rotatably supported within the housing. Additionally, the hook 168 extends from the second 160 and disposed opposite the pivots 166.

The hook 168 is sized and shaped to receive the second end 172 of the latch 138. The first end 170 of the latch 138 is formed as a pivot that is rotatably supported within the housing. The latch 138 has an inner surface 184 extending between the first end 170 and the second end 172 that has one or more teeth 174 extending therefrom. In this example, the latch 138 includes three teeth 174 that are sized and shaped to engage with the teeth 144 extending from the head 140 of the mount 112. The mount teeth 144 are circumferentially spaced around the head 140. By spacing a plurality of teeth 144 around the head 140 the latch 138 can engage with the mount 112 in many different positions to enable varying positions of the housing relative to the mount 112.

The head 140 also includes an opening 186 extending therethrough such that the mount 112 can be rotatably supported within the housing. Additionally, as illustrated the housing rotates relative to the mount 112 only along a plane that is orthogonal to the rotation axis 142 (shown in FIG. 2). However, in alternative examples, the housing may rotate relative to the mount 112 in any other orientation as required or desired. The tube 146 is sized and shaped to receive a boom as described above and also includes the thumb-turn shoulder 148 which has the threaded opening 150 therethrough so that the thumb-turn screw 114 (shown in FIG. 2) can threadably engage with the tube 146.

Figure 6:
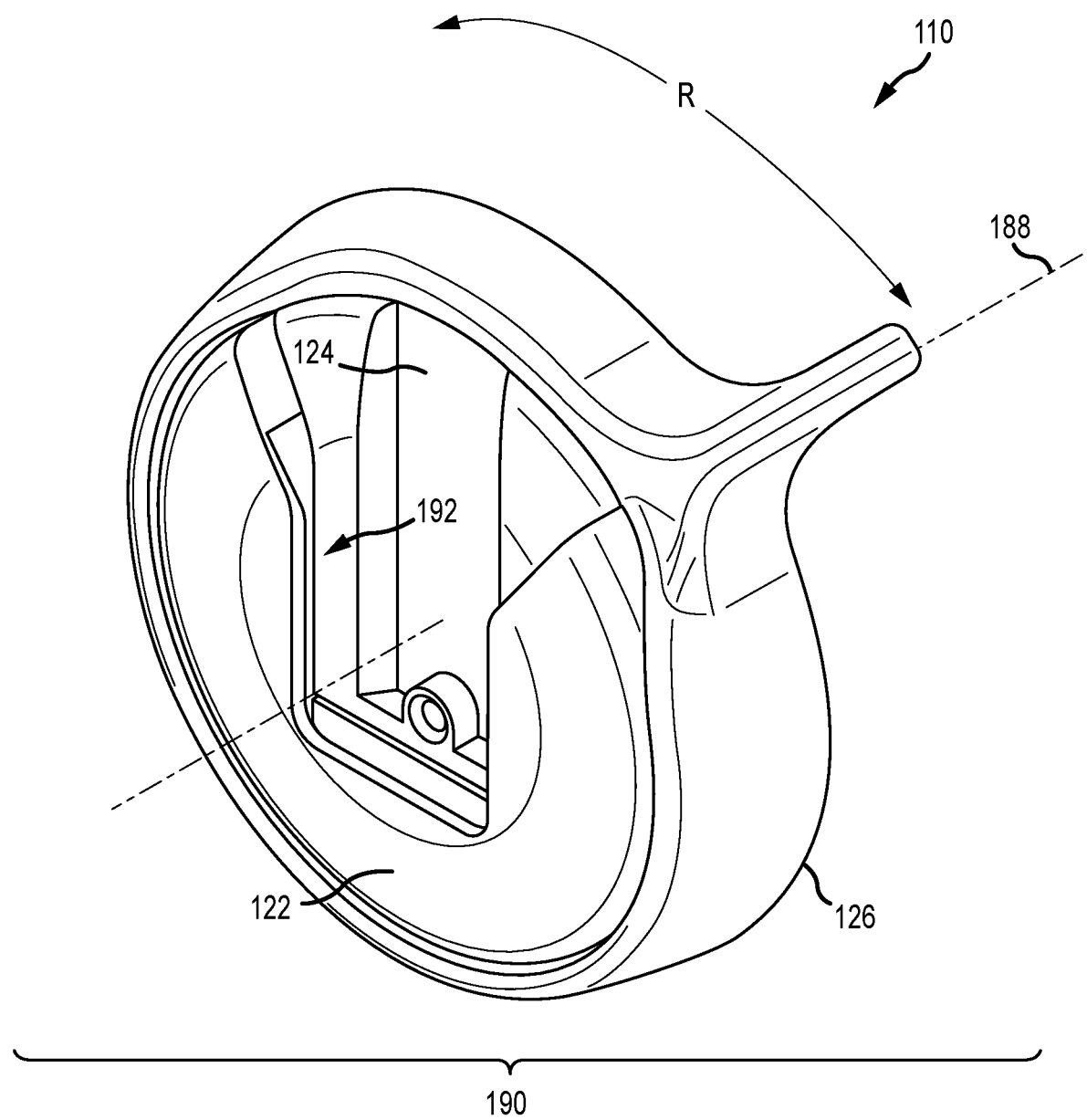
FIG. 6 is a perspective view of a clamp assembly of the mounting device.

FIG. 6 is a perspective view of the clamp assembly 110 of the mounting device 100 (shown in FIG. 1). The clamp assembly 110 is configured to attach to the first end of the housing and secure the shoe plate 111 of the camera accessory 101 (shown in FIG. 1B) as described above. The clamp assembly 110 includes the bracket 122, the base plate 124, and the lever ring 126. The bracket 122 is configured to couple to the mounting device housing and defines a longitudinal axis 188. In the example, the longitudinal axis 188 of the clamp assembly 110 aligns with the longitudinal axis of the mounting device, however, it is not necessarily required to do so. The base plate 124 is disposed at least partially within the bracket 122 and is coupled to the lever ring 126. The lever ring 126 is disposed around the bracket 122 and the base plate 124 and is configured to rotate about the longitudinal axis 188.

As illustrated in FIG. 6, the clamp assembly 110 is in an open position 190 in which the shoe plate of the camera accessory can be slid along the base plate 124 and into a gap 192 that is formed between the base plate 124 and the bracket 122. In operation, once the shoe plate is positioned within the clamp assembly 110, the lever ring 126 is rotated R around the longitudinal axis 188 into a closed position (not shown). As the lever ring 126 rotates the base plate 124 is moved linearly along the longitudinal axis 188 to decrease the gap 192 and compress and secure the shoe plate between the base plate 124 and the bracket 122.

Figure 7:
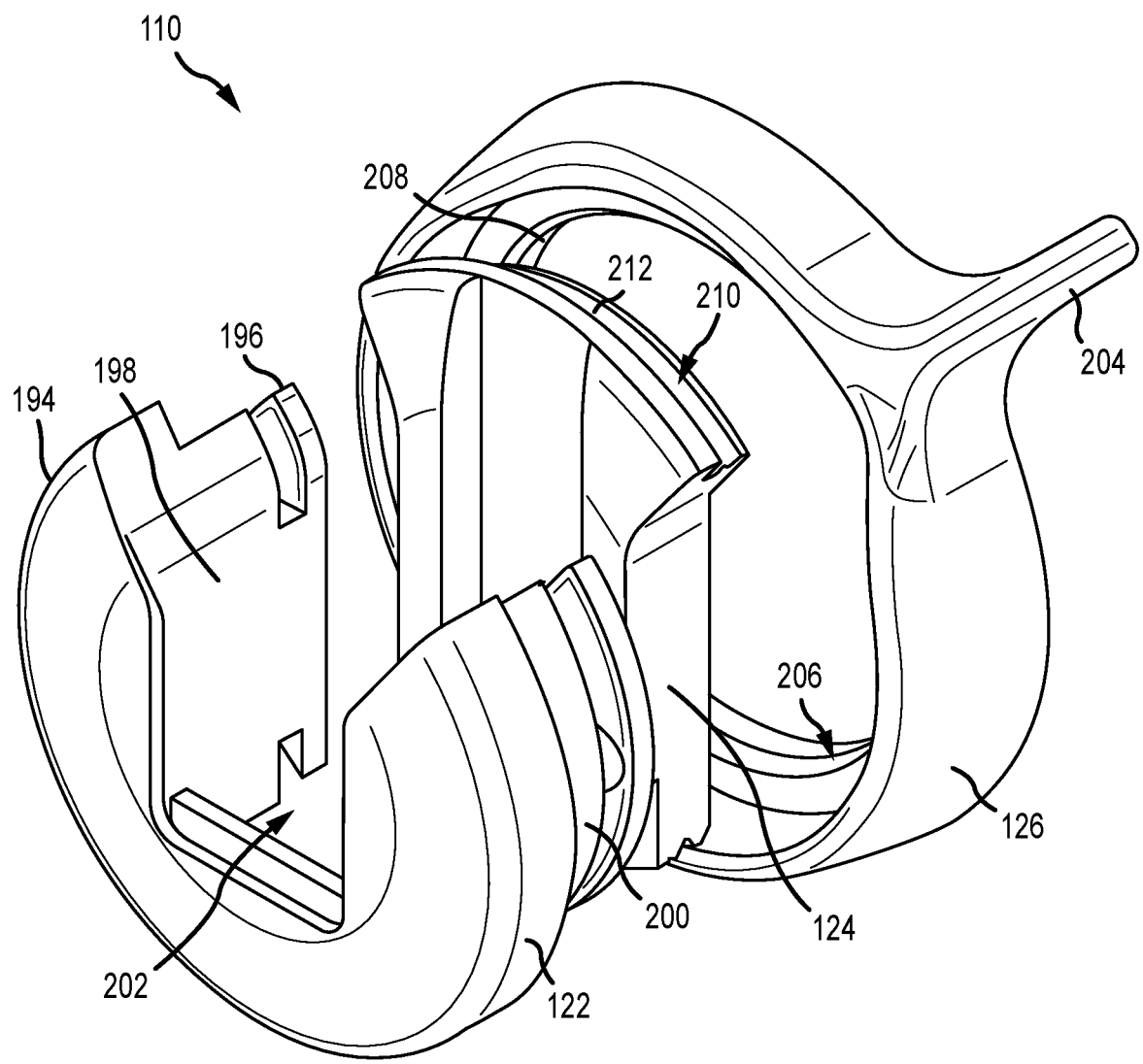
FIG. 7 is an exploded view of the clamp assembly.

FIG. 7 is an exploded view of the clamp assembly 110. In the example, the bracket 122 includes a first end 194 and an opposite second end 196 that extend along the longitudinal axis. The second end 196 is configured to couple to the housing of the mounting device. The bracket 122 also includes two opposing sidewalls 198, 200 extending from the first end 194 to the second end 196 and that define an inner channel 202 that is sized and shaped to receive the base plate 124.

The lever ring 126 is an annular ring that is disposed around the bracket 122 between the first end 194 and the second end 196, and has a lever 204 extending radially therefrom. The lever ring 126 includes an annular inner surface 206 that has one or more threads 208 defined therein. The base plate 124 includes at least one curved side surface 210 that has one or more corresponding threads 212 such that the base plate 124 is threadably engaged with the lever ring 126. In the example, the base plate 124 is disposed at least partially within the bracket 122 between the first end 194 and the second end 196 and at least partially within the annular inner surface 206 of the lever ring 126.

In operation, the bracket 122 is fixed relative to the housing of the mounting device with the base plate 124 positioned within the inner channel 202 and the lever ring 126 disposed around the bracket 122. As such, the clamp assembly 116 does not include any components that can be removed without disassembling the entire mounting device, this prevents components from being lost or misplaced during use. When the lever ring 126 is rotated around the longitudinal axis and in relation to the bracket 122 and the base plate 124, the base plate 124 moves linearly along the longitudinal axis because the bracket 122 prevents rotation of the base plate 124. As such, the rotational movement of the lever ring 126 is translated into linear movement of the base plate 124 via the threaded connection. When the clamp assembly 110 is in the open position, the base plate 124 is positioned more towards the second end 196 of the bracket 122, and when the clamp assembly 110 is in the closed position, the base plate 124 is positioned more toward the first end 194 of the bracket 122 so as to secure the shoe plate of the camera accessory between the base plate 124 and the first end 194 of the bracket 122.

Figure 8:
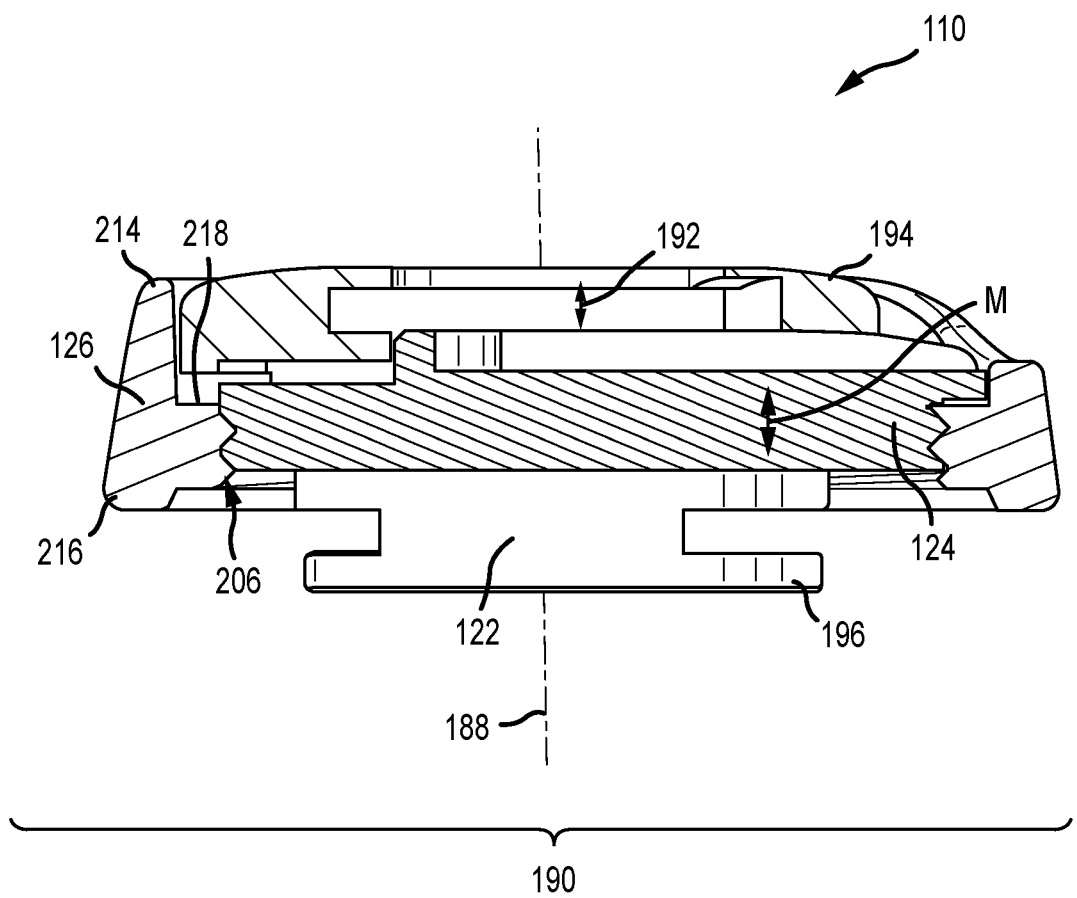
FIG. 8 is a cross-sectional view of the clamp assembly.

FIG. 8 is a cross-sectional view of the clamp assembly 110 taken along the longitudinal axis 188. As illustrated, the lever ring 126 is engaged with the base plate 124 such that the clamp assembly 110 is in the open position 190 and the gap 192 is formed between the base plate 124 and the bracket 122 to receive the shoe plate of the camera accessory. The second end 196 of the bracket 122 is configured to couple to the housing of the mounting device such that the bracket remains fixed and stationary upon rotation of the lever ring 126 and movement of the base plate 124.

The lever ring 126 includes a first end 214 and an opposite second end 216. The second end 216 is configured to be positioned adjacent to the first end 104 of the housing 102 (shown in FIG. 1) and side in relation to the housing when the lever ring 126 is rotated. The lever ring 126 also includes an annular shoulder seat 218 that is adjacent to the annular inner surface 206 and between the first end 214 and the second end 216. A portion of the bracket 122 is configured to ride on the annular shoulder seat 218, and as such, secure the lever ring 126 between the bracket 122 and the housing.

As illustrated in FIG. 8, the base plate 124 is threadably engaged with the lever ring 126 such that the gap 192 may receive the shoe plate of the camera accessory and the open position 190 is formed. Additionally, the base plate 124 is disposed at least partially within the bracket 122. As described above, when the lever ring 126 is rotated around the longitudinal axis 188, the threaded connection between the lever ring 126 and the base plate 124 translates the rotational movement of the lever ring 126 into linear movement M of the base plate 124 along the longitudinal axis 188. This is because the base plate 124 is rotationally restricted by the bracket 122. The movement M of the base plate 124 positions the base plate 124 closer towards the first end 194 of the bracket 122 an into the closed position (not shown). In the closed position, the gap 192 decreases thereby securing and compressing the shoe plate of the camera accessory between the base plate 124 and the bracket 122. In alternative examples, the base plate 124 may be coupled to the lever ring 126 through a cammed connection surface so as to translate rotational movement of the lever ring 126 into linear movement of the base plate 124.

Figure 9A:
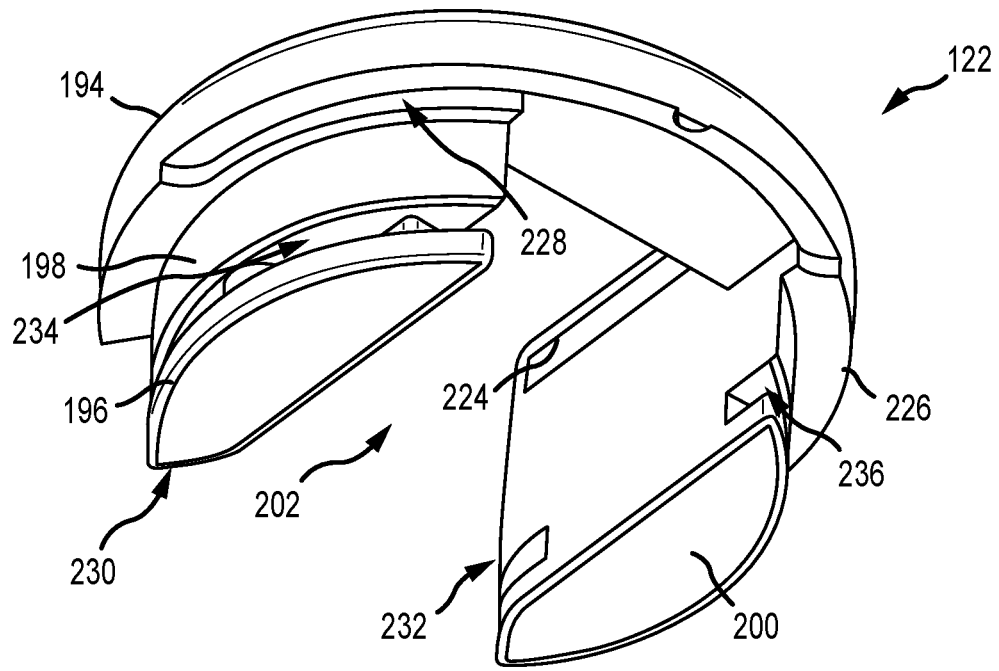
FIG. 9A is a perspective view of a bracket of the clamp assembly.
Figure 9B:
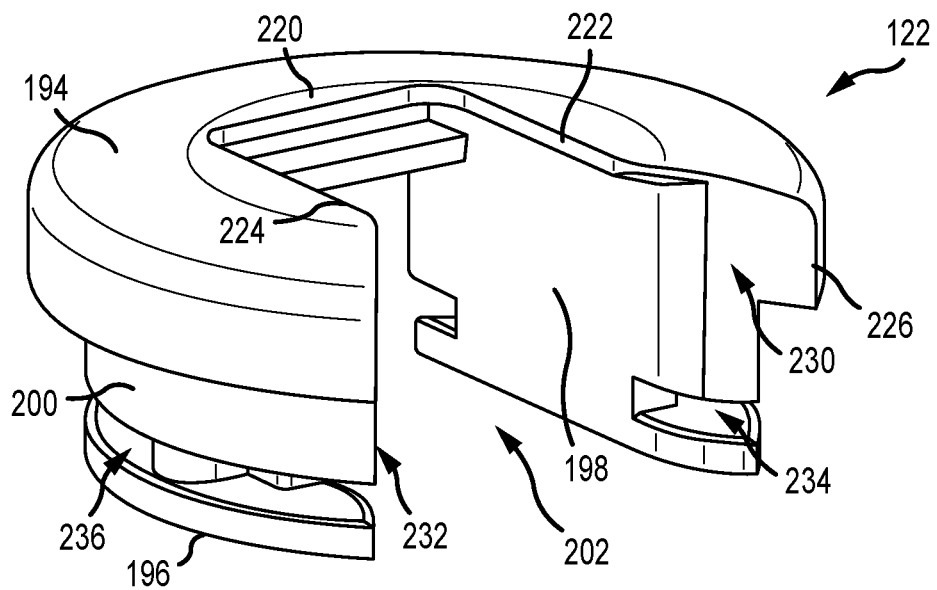
FIG. 9B is another perspective view of the bracket.

FIG. 9A is a perspective view of the bracket 122 of the clamp assembly 110 (shown in FIGS. 6-8). FIG. 9B is another perspective view of the bracket 122. Referring concurrently to FIGS. 9A and 9B, the bracket 122 includes the first end 194, the second end 196, and two opposing sidewalls 198, 200 extending therebetween and that define the inner channel 202. The first end 194 is substantially U-shaped with a cross-member 220 that extends between the sidewalls 198, 200 and across the inner channel 202. The cross-member 220 stops the shoe plate of the camera accessory from sliding all the way through the bracket 122 and facilitates a greater ease of use of the clamp assembly. The first end 194 also forms a lip 222, 224 along each sidewall 198, 200. The lips 222, 224 extend into the inner channel 202 and form the surface which engages the shoe plate of the camera accessory.

The bracket 122 also includes an outer shoulder 226 that extends from the sidewalls 198, 200 in a substantially U-shaped configuration and is positioned between the first end 194 and the second end 196. The outer shoulder 226 rides on the annular shoulder seat 218 of the lever ring 126 (shown in FIG. 8) when the lever ring rotates. Additionally the outer shoulder 226 secures the lever ring between the first end 194 of the bracket 122 and the second end 196 of the bracket 122 when coupled to the mounting device. A recess 228 is defined in a portion of the outer shoulder 226. The recess 228 extends from the first sidewall 198 around the U-shaped shoulder and towards the second sidewall 200. The recess 228 is configured to receive a detent 238 formed on the lever ring 126 (shown in FIG. 10) and defines the rotation angle of the lever ring around the bracket 122. This limits the amount of linear movement of the base plate so that it does not become disengaged from the lever ring due to over rotation.

Each sidewall 198, 200 has an oblique surface 230, 232 formed at the inlet of the inner channel 202. The oblique surfaces 230, 232 facilitate the capture of the shoe plate of the camera accessory so that it is easier to slide the shoe plate into the bracket 122 even if the shoe plate is off-angle to the inner channel 202. The second end 196 includes a dovetail defined on each sidewall 198, 200. The dovetail is formed by a cutout 234, 236 so that the second end 196 is received between two layers of the mounting device housing and to fixedly secure thereto.

Figure 10:
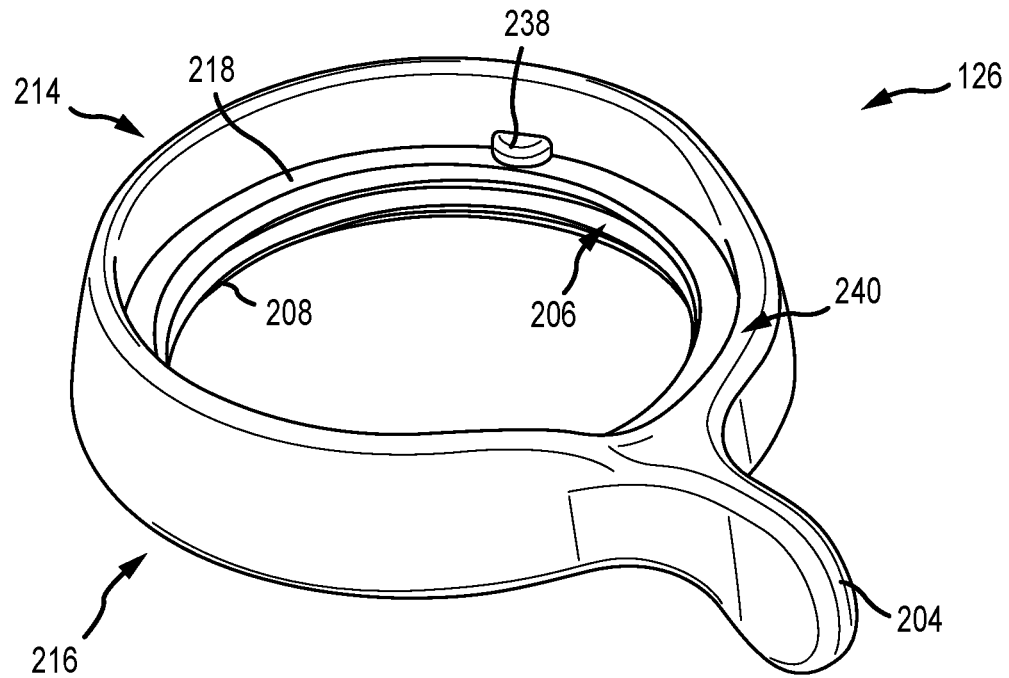
FIG. 10 is a perspective view of a lever ring of the clamp assembly.

FIG. 10 is a perspective view of the lever ring 126 of the clamp assembly 110 (shown in FIGS. 6-8). The lever ring 126 includes the first end 214, the second end 216, the lever 204, and the annular inner surface 206 with threads 208. Additionally, a detent 238 is formed on the annular shoulder seat 218. The detent 238 is sized and shaped to be received within the recess 228 on the bracket 122 (shown in FIG. 9A) and is utilized to defined the rotational angle of the lever ring 126. The detent 238 travels within the recess and since the bracket is fixed, when the detent 238 reaches the end of the recess further rotation of the lever ring 126 is prevented. Additionally, one or more circumferential notches 240 are defined on the first end 214. In the open position of the clamp assembly, the notch 240 aligns with the inner channel 202 of the bracket 122 (shown in FIG. 9B) so that the shoe plate of the camera accessory may more easily slide therein. In the closed position of the clamp assembly, the notch 240 rotates out of the inner channel so that the taller portion of the first end 214 is aligned with the inner channel to block the shoe plate of the camera accessory from undesirably sliding out of the bracket.

Figure 11:
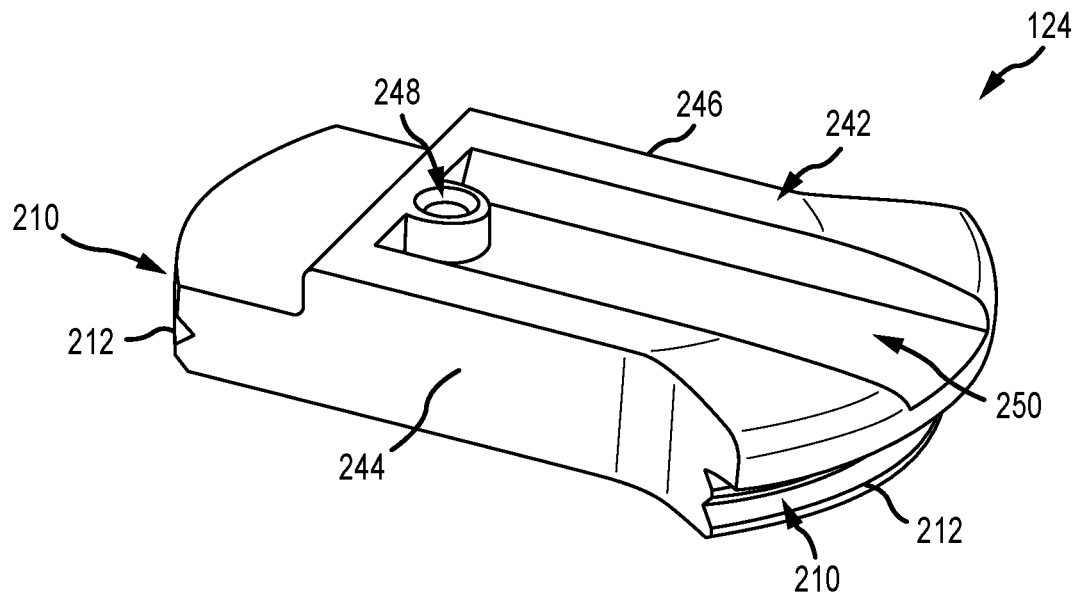
FIG. 11 is a perspective view of a base plate of the clamp assembly.

FIG. 11 is a perspective view of the base plate 124 of the clamp assembly 110 (shown in FIGS. 6-8). The base plate 124 includes two curved side surfaces 210 with threads 212 such that the base plate 124 is threadably received within the lever ring. The base plate 124 includes a first surface 242 positioned between two sidewalls 244, 246. The sidewalls 244, 246 are shaped to correspond to the inner channel of the bracket and including the oblique surfaces 230, 232 of the bracket (shown in FIG. 9B) such that the base plate 124 can be received within the bracket. The first surface 242 is configured to have the shoe plate of the camera accessory positioned thereon and then when the clamp assembly is closed the first surface 242 moves towards the lips 222, 224 of the bracket (shown in FIG. 9A) so that the shoe plate is secured between the base plate 124 and the bracket.

The first surface 242 includes a lock hole 248 that is configured to receive at least a portion of the stopper pin 113 that extends from the shoe plate 111 of the camera accessory 101 (shown in FIG. 1B). Additionally, a channel 250 is defined on the first surface 242 to facilitate the stopper pin sliding into the lock hole 248. On one side of the base plate 124, the first surface 242 extends over the curved side surface 210 so that the first surface 242 is flush with the notch of the lever ring (shown in FIG. 10) when the clamp ring is in the open position.

In the example, the base plate 124 is "cold" in that there are no electrical contacts that induce an electrical and/or communication connection with the shoe plate of the camera accessory. In other examples, the base plate may include one or more electrical contacts so that the mounting device is configured to engage a "hot" shoe plate of the camera accessory and the mounting device and the camera accessory are electrically and/or communicatively coupled to one another.

Figure 12:
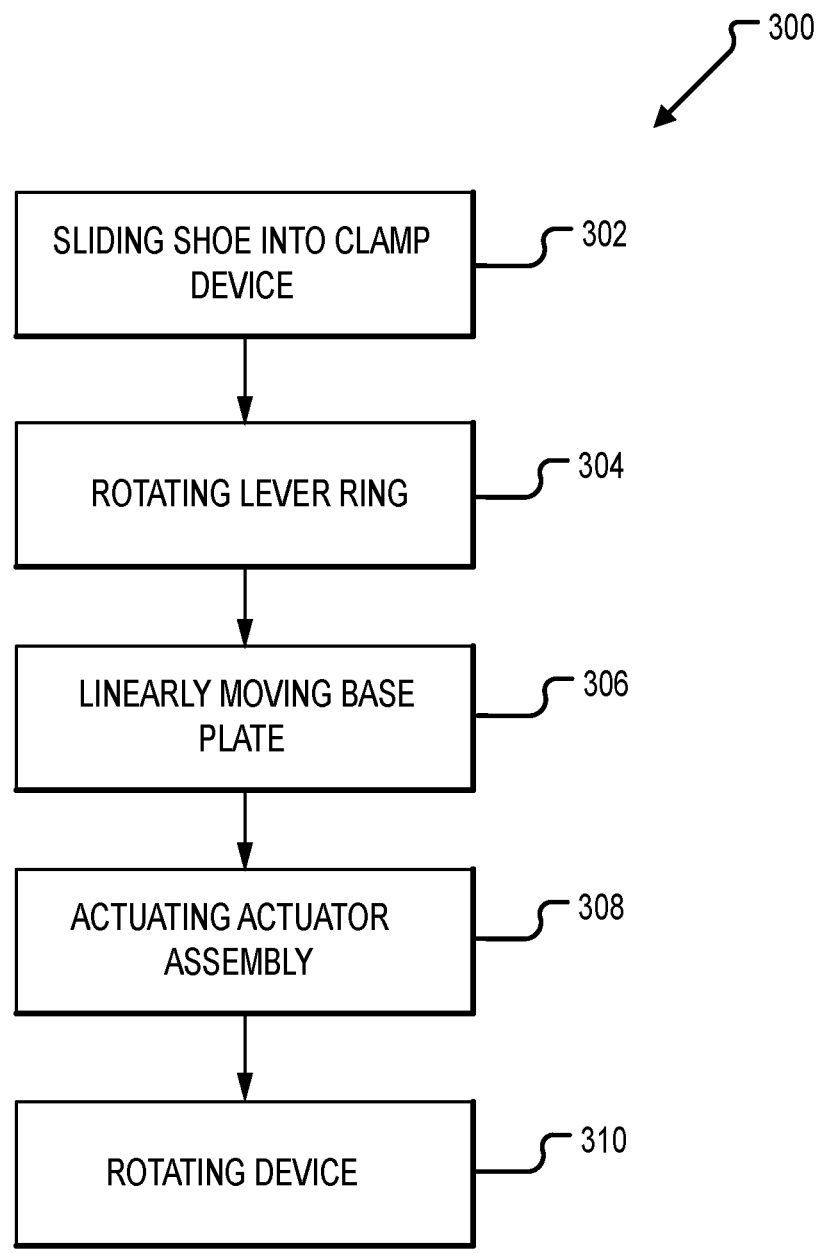
FIG. 12 is a flowchart illustrating a method of mounting a camera accessory to a mounting device.

FIG. 12 is a flowchart illustrating a method 300 of mounting a camera accessory to a mounting device. A shoe plate of the camera accessory is slide into a clamp assembly between a bracket and a base plate (operation 302). A lever ring of the clamp assembly, which is threadably engaged with the base plate, is then rotated (operation 304). Substantially simultaneously with the rotation of the lever ring, the base plate is linearly moves towards the bracket so that the shoe plate is secured between the base plate and the bracket (operation 306). When the camera accessory is mounted to the mounting device, an actuator assembly disposed at least partially within the mounting device may be actuated to disengage a latch with a mount of the mounting device (operation 308). This enables the mounting device to rotate relative to the mount so as to position the camera accessory as require or desired (operation 310).

The materials utilized in the mounting devices described herein may be those typically utilized for camera and camera accessory manufacture. For example, moldable plastics may be used for the housing, while aluminum, steel, stainless steel, zinc, or composite materials can be utilized for the other components. In some examples, the housing and the bracket may be unitary formed.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components and individual functions can be distributed among different components. In this regard, any number of the features of the different embodiments described herein may be combined into one single embodiment and alternate embodiments having fewer than or more than all of the features herein described as possible.

While various embodiments have been described for purposes of this disclosure, various changes and modifications may be made which are well within the scope of the disclosed methods. Numerous other changes may be made which will readily suggest themselves to those skilled in the art and which are encompassed in the spirit of the disclosure.

What is claimed:

1. A clamp assembly for securing a shoe plate of a camera accessory, the clamp assembly comprising:
    a bracket comprising a first end and an opposite second end and defining a longitudinal axis;
    a lever ring disposed around the bracket between the first end and the second end, wherein the lever ring is configured to rotate around the longitudinal axis between an open position and a closed position, the lever ring comprising an annular inner surface having one or more threads; and
    a base plate comprising at least one side surface having one or more threads that correspond to the one or more threads of the lever ring, wherein the base plate is disposed at least partially within the bracket between the first end and the second end and at least partially within the annular inner surface, the base plate configured to move along the longitudinal axis between a first position and a second position when the lever ring is rotated about the longitudinal axis, and wherein when the lever ring is in the closed position, the base plate is in the second position so as to secure the shoe plate between the base plate and the first end of the bracket.

2. The clamp assembly of claim 1, wherein the bracket comprises two sidewalls that define an inner channel configured to receive at least a portion of the shoe plate, and wherein each sidewall comprises an oblique surface disposed at an inlet of the inner channel.

3. The clamp assembly of claim 2, wherein the first end of the bracket comprises at least one cross-member that extends across the inner channel.

4. The clamp assembly of claim 2, wherein the base plate is configured to be received within the inner channel.

5. The clamp assembly of claim 2, wherein the lever ring comprises a first end and an opposite second end, the first end comprising at least one circumferential notch defined therein, and wherein when the lever ring is in the open position, the at least one circumferential notch aligns with the inlet of the inner channel.

6. The clamp assembly of claim 1, wherein the bracket comprises an outer shoulder and the lever ring comprises an annular shoulder seat that the outer shoulder rides on when the lever ring rotates, and wherein the annular shoulder seat comprises a detent and the outer shoulder comprises a recess configured to receive the detent, the recess defining a rotation angle of the lever ring.

7. The clamp assembly of claim 1, wherein the bracket is configured to remain stationary upon rotation of the lever ring and movement of the base plate.

8. The clamp assembly of claim 1, wherein the base plate comprises a lock hole configure to receive at least a portion of a stopper pin extending from the shoe plate.

9. The clamp assembly of claim 1, wherein the base plate comprises one or more electrical contacts.

10. The clamp assembly of claim 1, wherein the lever ring rotates relative to the bracket and the base plate.

11. A device for a camera accessory, the device comprising:
    a housing comprising a first end and an opposite second end and defining a longitudinal axis;
    a mount rotatably mounted at least partially within the housing and extending from the second end, wherein the mount is configured to attach to a boom, and wherein the housing is rotatable relative to the mount about a rotation axis that is orthogonal to the longitudinal axis;
    an actuator assembly disposed at least partially within the housing; and
    a latch disposed within the housing and coupled to the actuator assembly, wherein the actuator assembly is configured to move the latch between a first position and a second position, and wherein in the first position, the latch is engaged with the mount preventing rotation of the housing relative to the mount, and in the second position, the latch is disengaged with the mount enabling rotation of the housing relative to the mount.

12. The device of claim 11, wherein the actuator assembly comprises a biasing element, and wherein the latch is biased into the first position by the biasing element.

13. The device of claim 12, wherein the actuator assembly comprises a trigger comprising a first end and a second end, and wherein the first end is biased by the biasing element and the second end is pivotably disposed within the housing and coupled to the latch.

14. The device of claim 11, wherein the mount comprises a plurality of circumferentially spaced teeth configured to engage with the latch.

15. The device of claim 14, wherein the latch comprises a single tooth configured to engage with the mount.

16. The device of claim 11, wherein the latch pivots between the first position and the second position.

17. The device of claim 11 further comprising a clamp assembly coupled to the first end of the housing, wherein the clamp assembly is configured to secure a shoe plate of a camera accessory.

18. The device of claim 17, wherein the clamp assembly comprises:
   a bracket configured to couple to the first end of the housing;
   a lever ring disposed around the bracket, wherein the lever ring is configured to rotate about the longitudinal axis between an open position and a closed position, the lever ring comprising an annular inner surface having one or more threads; and
   a base plate comprising at least one side surface having one or more threads that correspond to the one or more threads of the lever ring, wherein the base plate is disposed at least partially within the bracket and at least partially within the annular inner surface, the base plate configured to move along the longitudinal axis between a first position and a second position when the lever ring is rotated about the longitudinal axis, and wherein when the lever rings is in the closed position, the base plate is in the second position positioned so as to secure the shoe plate between the base plate and the first end of the bracket.

19. The device of claim 18, wherein the second end of the bracket comprises a dovetail configured to couple to the first end of the housing.

20. A method of mounting a camera accessory to a device, the method comprising:
   sliding a shoe plate of the camera accessory into a clamp assembly, wherein the shoe plate is positioned between a bracket and a base plate;
   rotating a lever ring of the clamp assembly, wherein the lever ring is threadably engaged with the base plate;
   substantially simultaneously with rotating the lever ring, linearly moving the base plate towards the bracket so as to secure the shoe plate between the base plate and the bracket;
   actuating an actuator assembly disposed at least partially within the device to disengage a latch with a mount of the device; and
   rotating the device relative to the mount.

* * * * *